(12) United States Patent  
Achor

(10) Patent No.: US 9,404,454 B2
(45) Date of Patent: Aug. 2, 2016

(54) FUEL LEVEL SENSOR FOR MARINE FUEL VAPOR SEPARATOR EXTERNAL TO UNIT

(75) Inventor: Kyle Achor, Monticello, IN (US)

(73) Assignee: Carter Fuel Systems LLC, Cleveland, OH (US)

( * ) Notice: Subject to any disclaimer, the term of this patent is extended or adjusted under 35 U.S.C. 154(b) by 179 days.

(21) Appl. No.: 13/354,373

(22) Filed: Jan. 20, 2012

(65) Prior Publication Data

US 2012/0186562 A1 Jul. 26, 2012

Related U.S. Application Data

(60) Provisional application No. 61/434,461, filed on Jan. 20, 2011.

(51) Int. Cl.
*G01F 23/30* (2006.01)
*F02M 37/20* (2006.01)
*F02B 61/04* (2006.01)
*F02M 37/00* (2006.01)

(52) U.S. Cl.
CPC ........... *F02M 37/20* (2013.01); *G01F 23/30* (2013.01); *F02B 61/045* (2013.01); *F02M 37/0052* (2013.01)

(58) Field of Classification Search
CPC ........ F02M 25/08; F02M 37/22; G01F 23/72; G01F 23/74; G01F 23/30; G01F 23/64; G01F 23/76; G01F 25/0061; G01F 25/0069
USPC ........ 123/509, 518, 514, 520, 516; 73/290 R, 73/313–314
See application file for complete search history.

(56) References Cited

U.S. PATENT DOCUMENTS

| 1,838,135 | A | * | 12/1931 | Derby | G01F 23/64 200/225 |
| 3,586,015 | A | * | 6/1971 | Kitzner | 137/39 |
| 4,056,979 | A | * | 11/1977 | Bongort | G01F 23/74 200/84 C |
| 4,091,250 | A | * | 5/1978 | Siiberg | H01H 36/02 200/84 C |

(Continued)

FOREIGN PATENT DOCUMENTS

| JP | 9-184749 | 7/1997 |
| JP | 2009-515076 A | 4/2009 |
| WO | 03074863 A1 | 9/2003 |

OTHER PUBLICATIONS

International Search report PCT/US2012/021941 mailed on May 18, 2012.

(Continued)

*Primary Examiner* — Hung Q Nguyen
*Assistant Examiner* — Josh Campbell
(74) *Attorney, Agent, or Firm* — Jones Day

(57) ABSTRACT

A fuel vapor separator assembly including a housing having an open interior and a float disposed therein. At least one magnet is disposed on the float, and a sensor assembly which is responsive to magnetic fields is disposed externally of the housing. The sensor assembly senses the position of the float to determine whether vapor is present in the fuel vapor separator. If the sensor assembly determines that vapor is present in the fuel vapor separator, then it generates a signal, which a controller receives and activates a vapor vent valve to discharge the vapor and/or activates a fuel lift pump to pump additional fuel into the fuel vapor separator. The sensor assembly could be, for example, a Hall effect sensor or a reed-type sensor.

10 Claims, 8 Drawing Sheets

(56) References Cited

U.S. PATENT DOCUMENTS

| | | | |
|---|---|---|---|
| 4,253,332 A | 3/1981 | Sabatino et al. | |
| 4,602,605 A * | 7/1986 | Adkins | 123/516 |
| 4,649,898 A * | 3/1987 | Martinson | A23L 3/10 |
| | | | 126/348 |
| 4,804,944 A * | 2/1989 | Golladay et al. | 340/624 |
| 5,115,784 A * | 5/1992 | Mito | F02B 61/045 |
| | | | 123/514 |
| 5,586,466 A * | 12/1996 | Steiner | G01F 23/30 |
| | | | 73/311 |
| 5,653,103 A * | 8/1997 | Katoh | 60/283 |
| 5,666,819 A * | 9/1997 | Rockenfeller et al. | 62/480 |
| 6,158,972 A | 12/2000 | Ruth | |
| 6,390,871 B1 * | 5/2002 | Wickman et al. | 440/88 R |
| 6,553,974 B1 * | 4/2003 | Wickman et al. | 123/516 |
| 7,112,110 B1 * | 9/2006 | Kollmann | F02M 37/20 |
| | | | 440/88 F |
| 7,431,021 B1 | 10/2008 | Achor | |
| 7,503,314 B2 | 3/2009 | Achor | |
| 7,617,725 B2 * | 11/2009 | Howayshell | 73/322 |
| 7,640,916 B2 * | 1/2010 | Ulrey et al. | 123/446 |
| 2001/0039944 A1 * | 11/2001 | Braun et al. | 123/510 |
| 2006/0048757 A1 * | 3/2006 | Harvey | F02M 37/0047 |
| | | | 123/516 |
| 2006/0107932 A1 | 5/2006 | Shibata et al. | |
| 2006/0288777 A1 * | 12/2006 | Lazaris | A47J 31/4457 |
| | | | 73/313 |
| 2007/0079815 A1 * | 4/2007 | Shinkarenko et al. | 123/525 |
| 2008/0121217 A1 * | 5/2008 | Guterres | F02M 37/0017 |
| | | | 123/516 |
| 2009/0071448 A1 * | 3/2009 | Smith | F02M 37/20 |
| | | | 123/516 |
| 2009/0293843 A1 | 12/2009 | Kato et al. | |
| 2010/0018498 A1 * | 1/2010 | Hirose | 123/337 |

OTHER PUBLICATIONS

Office Action dated Nov. 6, 2015, from Corresponding Chinese Patent Application No. 201280005974.8, and English translation of same.

Office Action dated Jan. 19, 2016, from Corresponding Japanese Patent Application No. 2013-550594, and English translation of same.

Office Action dated Jun. 2, 2016, from Corresponding EPO Patent Application No. 127021103-1606.

* cited by examiner

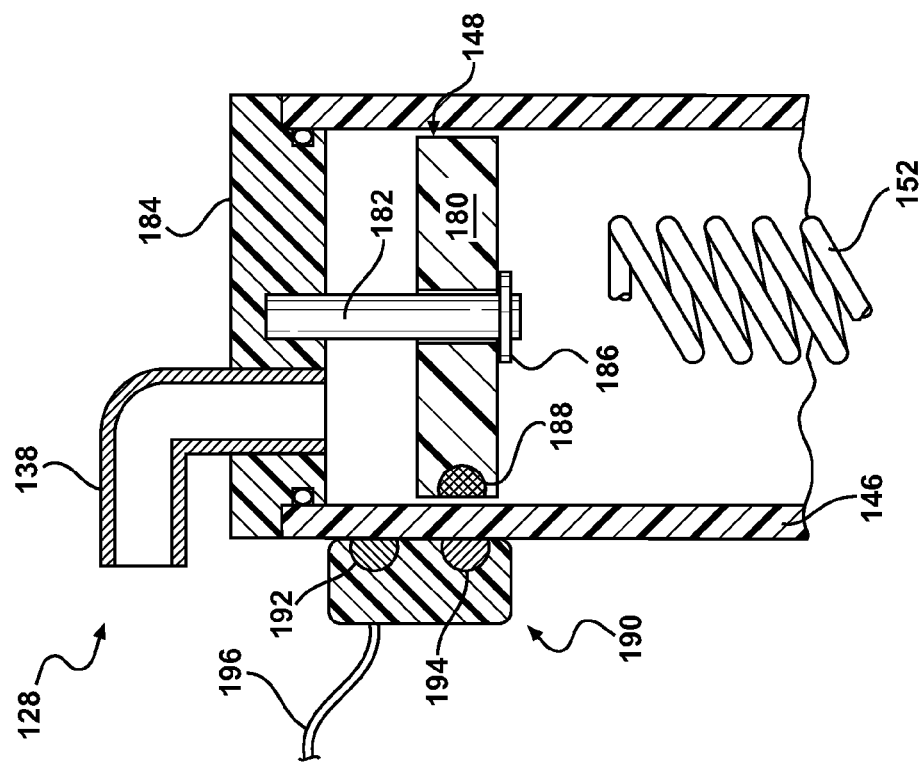
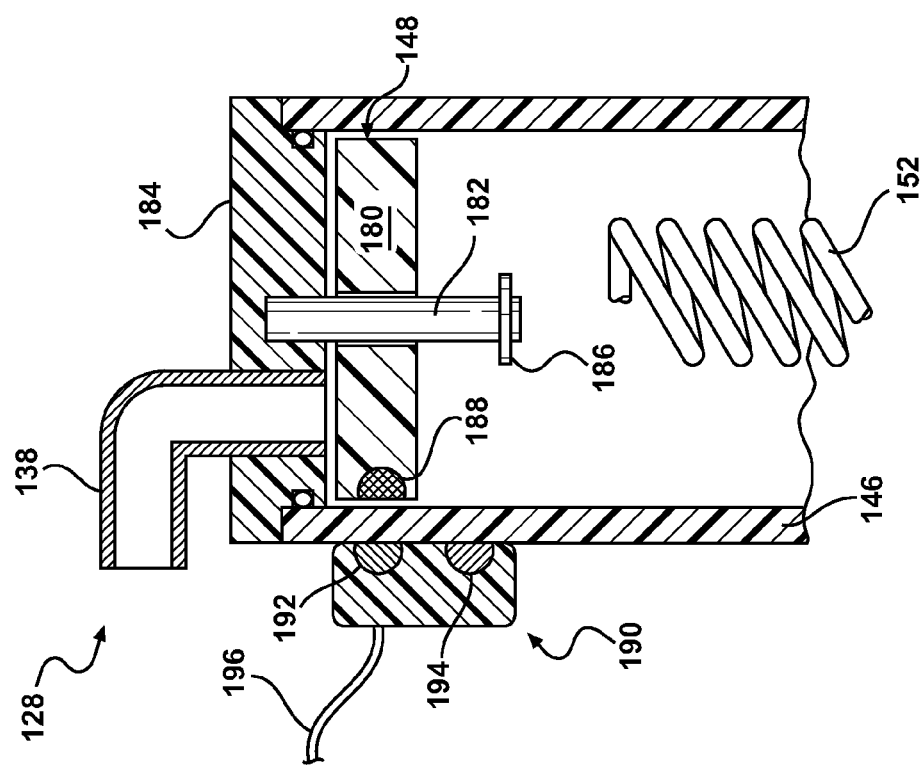

FUEL LEVEL SENSOR FOR MARINE FUEL VAPOR SEPARATOR EXTERNAL TO UNIT

CROSS REFERENCE TO RELATED APPLICATIONS

This application claims priority to Provisional Patent Application No. 61/434,461 filed Jan. 20, 2011, the entire disclosure of which is hereby incorporated by reference and relied upon.

BACKGROUND OF THE INVENTION

1. Field of the Invention

The present invention is related to vapor separators, and more particularly to vapor separators for fuel systems of marine engines.

2. Related Art

Fuel vapor is a long recognized issue in the marine fuel industry. Small outboard marine engines, including transom mounted and stern drive units frequently utilize an integrated fuel system which draws liquid fuel under suction from a can or tank located in the boat. The fuel is drawn under suction because boat safety regulations require that fuel routed between the tank and engine be sucked under a vacuum to prevent fuel from spilling into the boat should the fuel line rupture. However, the fact that fuel is withdrawn from the tank at a negative pressure can be problematic because, at such low pressures, the fuel can readily evaporate. This, combined with the vapor-producing effects of high temperatures and jarring conditions, could lead to vapor lock and diminished pumping efficiencies if not addressed.

The excessive vapor issue is typically addressed by routing the fuel through a fuel vapor separator unit and then delivering it at a high pressure to the fuel injection system of the engine. In addition to the naturally arising vapors from the vacuum drawing steps, unused, hot fuel from the fuel rail is returned to the vapor separator where fuel vapors are condensed back to liquid before the fuel is reintroduced to the high pressure pump and fuel rail. Uncondensed fuel vapors can be vented to atmosphere or pulled into the engine intake system through a vacuum line connection.

FIGS. 1 and 2 generally depict an outboard marine engine 12 affixed to the transom 14 of a boat, as described more fully in Applicant's U.S. Pat. No. 7,503,314, the entire disclosure of which is hereby incorporated by reference. Outboard marine engines 12 of this type are often mounted to a bracket 16 so that the engine 12 can be quickly removed from the boat for transportation and/or maintenance. The bracket 16 in this example allows the motor head to be rotated about axis A launching, shallow conditions maneuvering, and trim control.

An engine of the type shown in FIG. 1, as well as other marine engine types, commonly run on a liquid fuel like gasoline or ethanol. Liquid fuel is drawn from a fuel tank 20 by an engine-mounted marine fuel system, such as the system generally shown at 22 in FIG. 2. Except for the fuel tank 20 and a supply line 24, the remainder of the fuel system 22 is typically (but not necessarily) integrated into the engine 12.

In operation, a low pressure fuel supply pump 26 sucks fuel from the tank 20 through the supply line 24. The fuel is delivered to a vapor separator, generally indicated at 28. The vapor separator 28 collects and discharges vapors given off from the incoming low pressure fuel and also from the hot, agitated fuel returning from the engine 12. A high pressure pump 30 then pumps the fuel under pressure into the fuel injector system 32 to be consumed by the engine. Unused fuel is returned to the vapor separator 28 via return line 34. A vent valve device, generally indicated at 36, may be provided for connection to the engine intake vacuum system. The vacuum system creates a negative pressure in the vent line 40 so that fuel vapors can be cycled through the engine 12.

The low pressure fuel supply pump 26, also known as a lift pump, may be of the pulsed diaphragm type or any other suitable type. Diaphragm type fuel pumps are sometimes preferred in these applications because they are less susceptible to pumping problems when the fuel is hot and there is a high vapor concentration. Typically, these pulsed diaphragm pumps are operated by air pressure fluctuations generated in the crank case portion of the engine 12. One exemplary pulse pump is shown in Applicant's own U.S. Pat. No. 6,158,972, which is incorporated herein by reference in its entirety.

FIG. 3 shows a simplified, cross-sectional view of one known type of fuel vapor separator assembly 28'. The lift pump 26' is of the diaphragm type but not energized by engine pulses. Rather, an electro-mechanical device is used to reciprocate a diaphragm (not shown) within the lift pump 26' to generate the vacuum. The electro-mechanical device may be a linear motor (e.g., a solenoid), a rotating shaft motor, or any other type of electro-mechanical machine. Fuel is drawn, under vacuum, from a tank (not shown) through the supply line 24' and discharged into the interior of the fuel vapor separator assembly 28' via inlet 50'. Hot fuel returning from the fuel injectors via return line 34' also enters the interior of the vapor separator assembly 28' and intermingles with fuel delivered from the lift pump 26'. A cooling tube 52' is positioned inside the vapor separator 28' for the purpose of exchanging heat and reducing the temperature of fuel inside the vapor separator 28'. A continuous supply of water is fed through the cooling tube 52' from an inlet 54' to an outlet 56'. A vapor vent 35' allows fuel vapors to be drawn out of the fuel vapor separator 28'. A high pressure pump 30' draws fuel from a fuel intake 42' and discharges the fuel through an outlet 44' to the fuel injection system of the engine.

Considering the lift pump 26' in greater detail, FIG. 3 shows an power source 60' for powering the electro-mechanical device inside the lift pump 26'. A manual prime lever 62' may be included for the purpose of manually priming the lift pump 26' in appropriate circumstances.

As will be understood by those of skill in the art, many known vapor separators, such as those described above in connection with FIGS. 2 and 3, use a float/needle assembly 36, 36' for fuel vapor out control and/or fuel inlet control. However, such float/needle assemblies 36, 36' are susceptible to wear and leakage. Alternative concepts have been developed using electronic sensors (not shown) disposed inside of the vapor separator unit which require routing wires through the separator housing some form of pass-through sealed connector. Such pass-through sealed connectors often leak and can be associated with common failure modes.

SUMMARY OF THE INVENTION

At least one aspect of the subject invention provides for a marine fuel vapor separator with an externally mounted sensor. The vapor separator includes a housing having an open interior and a float disposed in the housing. The float is moveable in a vertical direction in response to changing fluid levels in the open interior between a pair of pre-established constraints. At least one magnet is disposed on the float, and a sensor assembly which is responsive to movement of the magnet is disposed externally of the housing. When the fluid level of the tank lowers, the sensor assembly detects the lowering of the float and transmits a signal to a controller, which takes remedial action by activating a fuel lift pump to pump additional fuel into the vapor fuel separator and/or opening a vapor vent valve to discharge vapors out of the fuel vapor separator.

The externally mounted sensor assembly with the separate vapor vent valve is advantageous over float/needle assemblies because it is less susceptible to wear and leakage. Additionally, because the sensor is mounted externally of the housing, a pass-through connector for running wires into the housing is not required. Thus, the fuel vapor separator is more reliable and less susceptible to wear and leakage than other known fuel vapor separators.

The marine fuel vapor separator could be used with any type of boat engine, e.g. an outboard motor, an inboard/outboard motor or an inboard motor. It could also be mounted internally to or externally of to the engine. The sensor assembly could be any type of sensor assembly which is responsive to magnetic fields including, for example, a Hall effect sensor or a reed-type sensor. A Hall Effect sensor might be preferred for reliability purposes because it has no moving parts.

According to another aspect of the invention, the sensor assembly includes a pair of sensor elements spaced vertically from one another. One of the sensor elements generates an electric signal when the float and magnet are in an uppermost position, and the other sensor element generates a different electrical signal when the float and magnet are in a lowermost position.

According to yet another aspect of the invention, a pair of magnets spaced vertically from one another are disposed on the float, and the sensor assembly only includes a single sensor element. The magnets have either different strengths from one another or different polarities. When the float is in an uppermost position, one of the magnets is in proximity with the sensor element, and the sensor element generates a signal. When the float is in the lowermost position, the other magnet is in proximity with the sensor element, and the sensor element generates a different signal.

BRIEF DESCRIPTION OF THE DRAWINGS

These and other features and advantages of the present invention will be readily appreciated, as the same becomes better understood by reference to the following detailed description when considered in connection with the accompanying drawings wherein:

FIG. 4A is a cross-sectional and fragmentary view of a vapor separator constructed according to one aspect of the invention with a float being in an uppermost position;

FIG. 4B is a cross-sectional and fragmentary view of the vapor separator of FIG. 4A and with the float being in a lowermost position;

DETAILED DESCRIPTION OF THE PREFERRED EMBODIMENT

Figure 1:
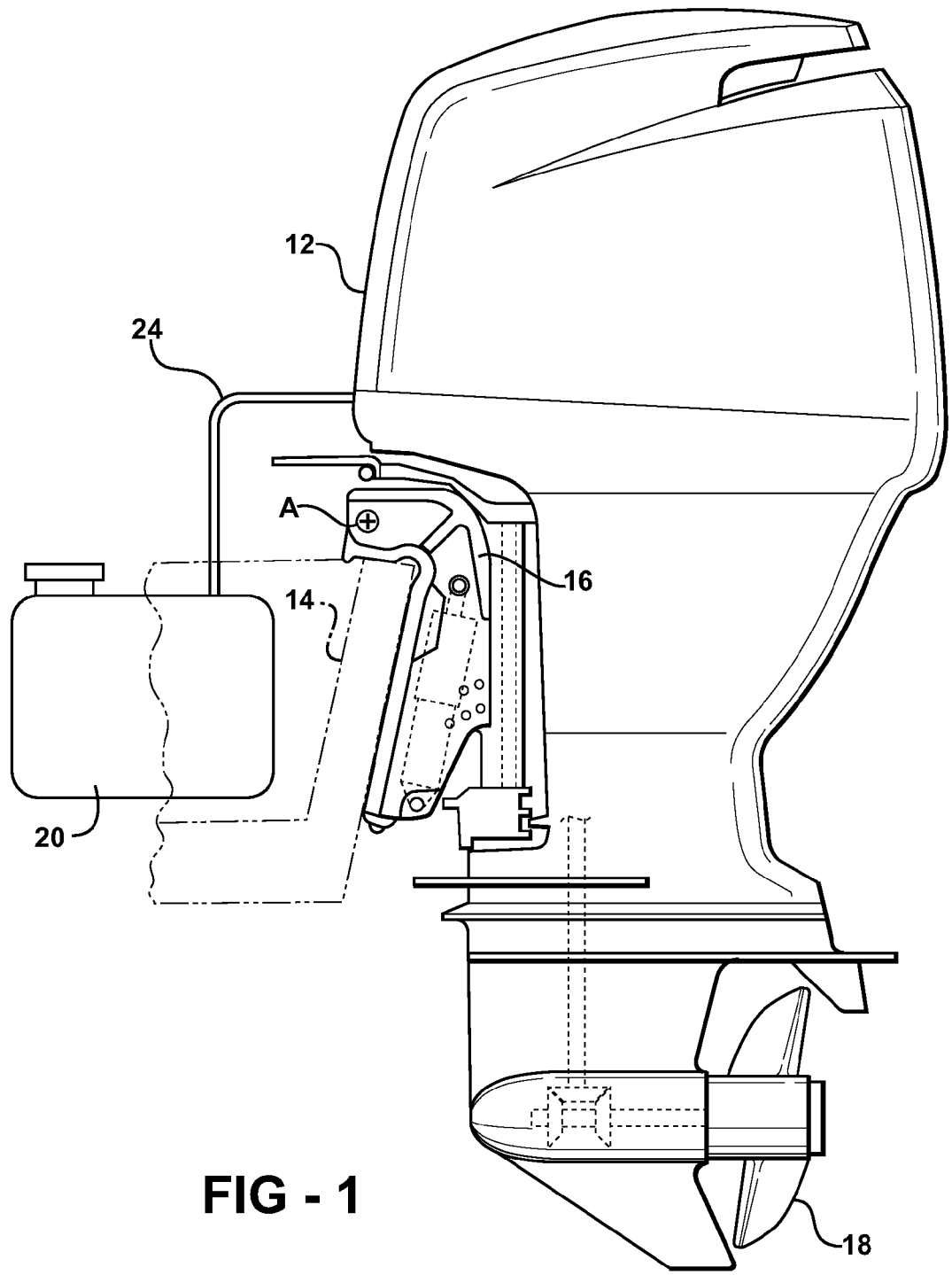
FIG. 1 is a side and elevation view of a known outboard marine engine.
Figure 2:
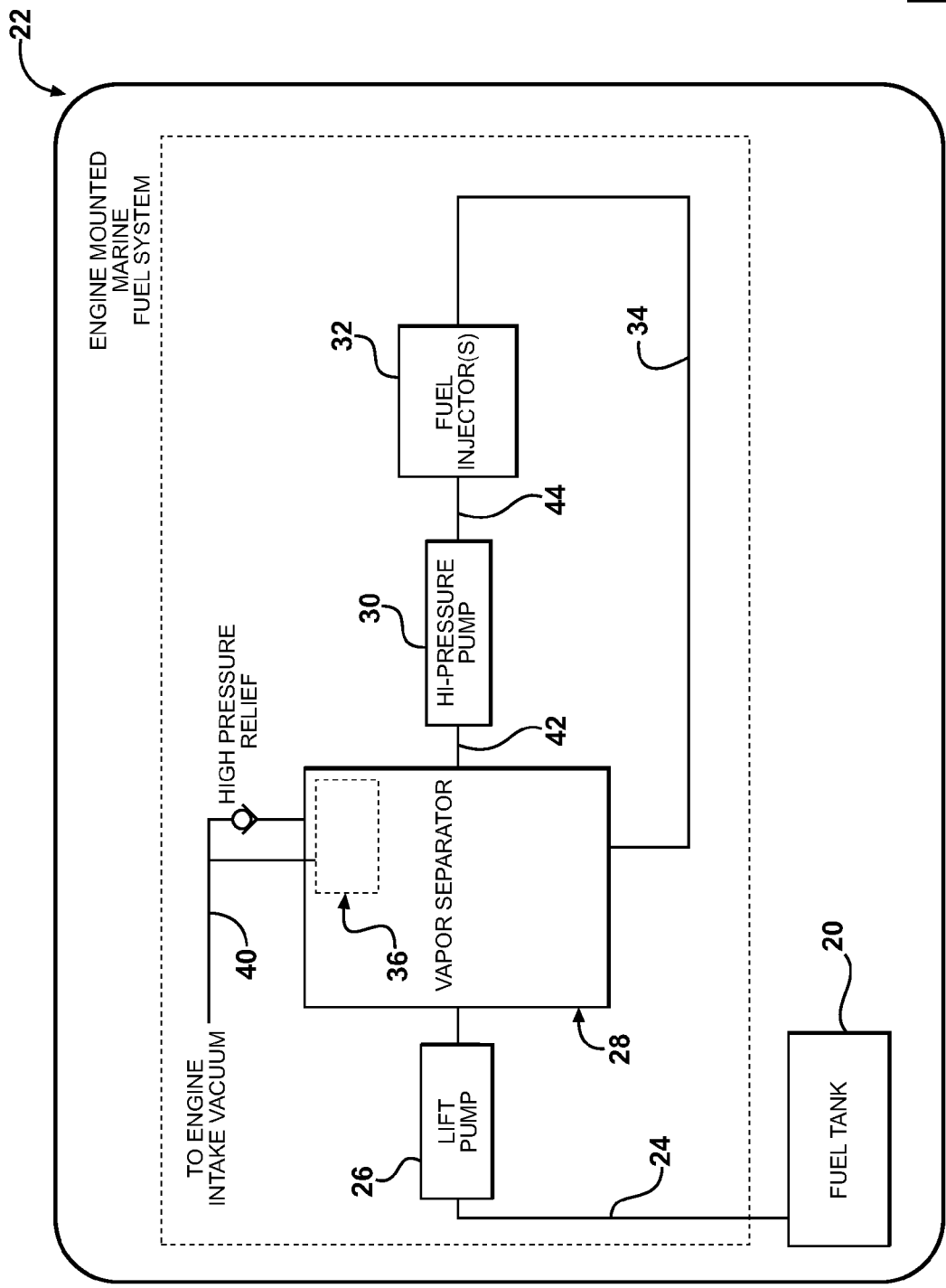
FIG. 2 is a schematic view of a known engine mounted marine fuel system.
Figure 3:
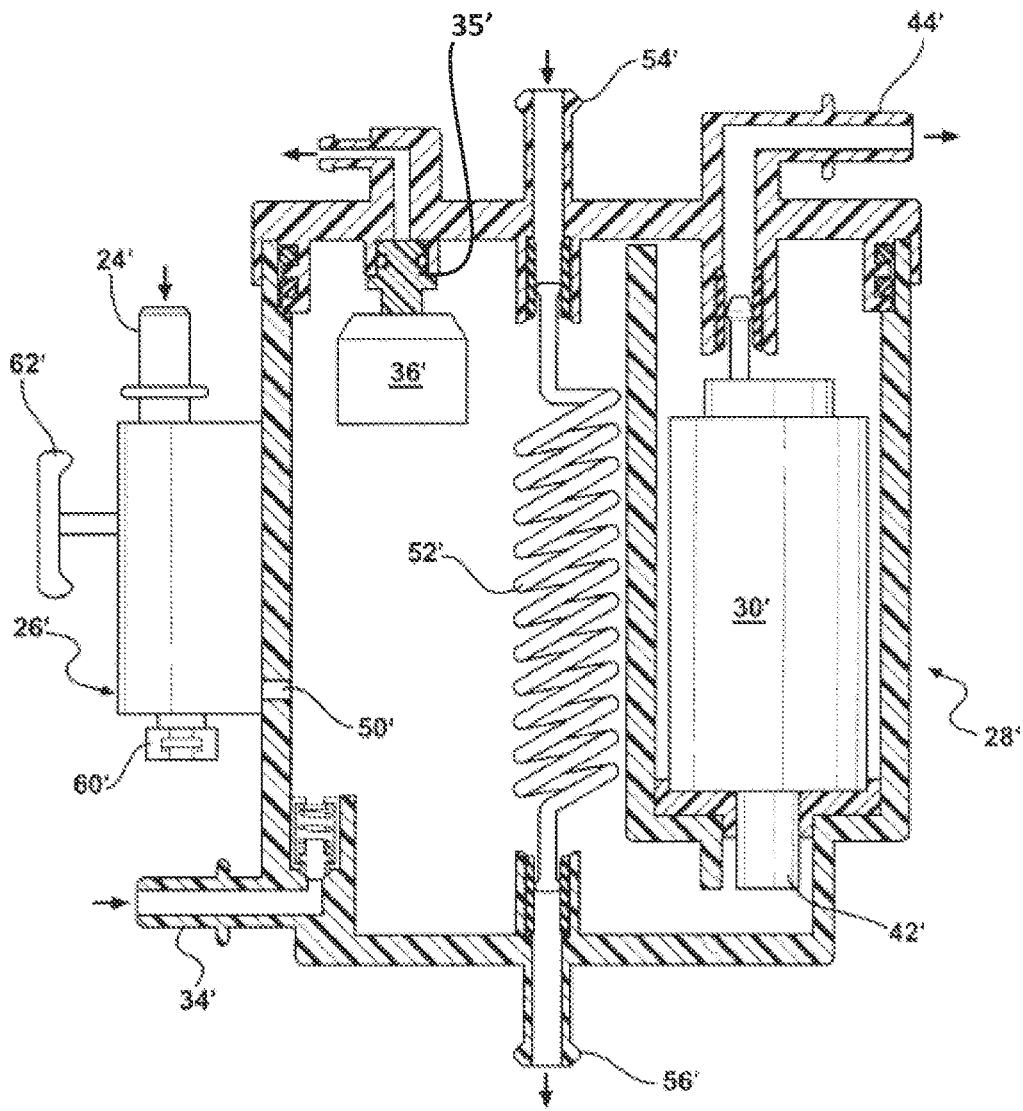
FIG. 3 is a cross-sectional view of a known vapor fuel separator.

Referring to FIGS. 4A and 4B, a fuel vapor separator assembly constructed according to one aspect of the present invention is shown generally at 128. For convenience, features like or corresponding to in those described above are indicated with previously established reference numerals together with factors offset by 100. In this design, the float assembly 148 includes a puck-like float body 180 slideably carried on a short shaft 182 extending downwardly from a cap 184 on a housing 146. A retainer clip 186 is attached to the distal end of the shaft 182 as a keeper to trap the float 180 on the shaft 182 and inside the vapor separator 128. The float body 180 may be circular or any other suitable shape. The float body 180 is less dense than the preferred fuel for the engine, and thus, the float body 180 is responsive to the level of fuel in the vapor separator unit 128 and is moveable along the shaft 182 between an upper constraint established by the cap 184 and a lower constraint established by the retainer clip 186. The vapor separator 128 also includes a vent pipe 138 extending outwardly from the cap 184 for venting fuel vapors out of the open interior, as will be discussed in further detail below. Further, the fuel vapor separator 128 includes a cooling tube 152 for exchanging heat between water and the fuel in the fuel vapor separator 128. The fuel vapor separator 128 could be used with any desirable type of marine engine including, for example, outboard engines, inboard/outboard engines or inboard engines.

At least a portion of the outer edge, or the perimeter, of the float body 180 carries at least one magnet 188. Directly opposite the magnet 188 and disposed externally of the housing 146 is a sensor assembly 190 which is responsive to magnetic fields. The externally mounted sensor assembly 190 is preferably of the Hall Effect type, i.e. the sensor assembly 190 produces a voltage (the Hall voltage) in response to a magnetic field. Hall Effect sensors generally have no moving parts, and thus, are known to offer enhanced reliability in extreme environments. They also have a long life expectancy as compared to the traditional float/needle assemblies 36, 36' described above and other types of electromechanical switches. The sensor assembly 190 can be mounted to the exterior of the housing 146 using any suitable technique, such as welding, brazing, bonding or mechanical fasteners. Preferably, the sensor assembly 190 is encapsulated in an appropriate protective material which does not have to be of a material resistant to fuel because the sensor assembly 190 is not disposed in the interior of the housing 146.

The sensor assembly 190 of this embodiment is a dual detection type device including first 192 and second 194 sensing elements. Each sensing element 192, 194 is responsive to the magnet 188 moving into proximity therewith or to the magnet 188 moving away therefrom. In FIG. 4A, the fuel level in the vapor separator 128 is very high, and thus, the float 180 is shown in an upper-most position such that the magnet 188 is in proximity with the first sensing element 192. The sensor assembly 190 then generates an electrical signal of the type well-known to those of skill in the electronic sensor arts. The electrical signal thus generated may be transmitted via an electrical cable 196 or wirelessly to a controller 198 (shown in FIG. 6), as will be discussed in further detail below. In FIG. 4B, the fuel level in the vapor separator 128 is low, and thus, the float 180 is in a lower-most position with the second sensing element 194 being in proximity with the magnet 188. The sensor assembly 190 then generates a different electrical signal which is also transmitted via an electrical cable 196 (or wirelessly) to the controller 198. As will be discussed in further detail below, when the fuel level in the vapor separator 128 is low, then undesirable fuel vapors are likely present in the vapor separator 128, which could cause vapor lock if not vented.

Figure 5:
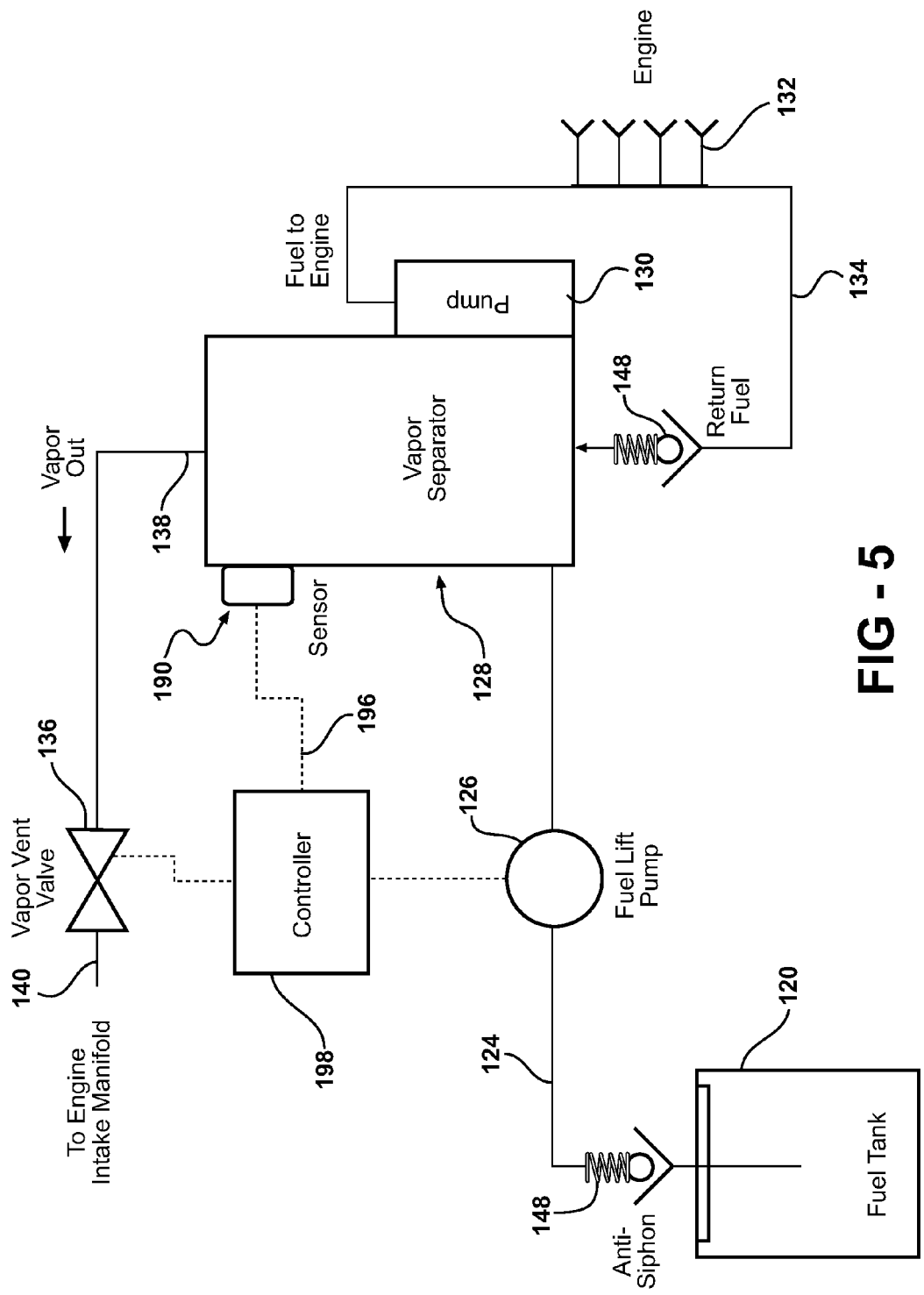
FIG. 5 is a schematic view of a marine fuel delivery system constructed according to an aspect of the subject invention.

A schematic view of the marine fuel delivery system according to one aspect of the subject invention is shown in FIG. 5. In operation, a lift pump 126 sucks fuel from the fuel tank 120 through the supply line 124. The fuel is delivered to the vapor separator 128, which collects and discharges vapors given off from the incoming low pressure fuel and also from the hot agitated fuel returning from the engine (not shown). A high pressure pump 130 then pumps the fuel under pressure into the fuel injector system 132 (or carburetor) to be consumed by the engine. Unused fuel is returned to the vapor separator 128 via a return line 134. A vent valve device 136 is attached to the vent pipe 138 for selectively allowing vapors to flow into the engine intake manifold via vent line 140 so that the vapors are cycled through the engine and burned. Alternately, the vapors could be discharged into the atmosphere. The fuel delivery system may also include at least one check valve 148 for preventing fuel from flowing back into the fuel PCT/US12/21941 tank 120 from the supply line 124 or from flowing to the fuel injectors 132 through the return line 134.

Referring back to FIGS. 4A and 4B, as discussed above, the first sensing element 192 is associated with a high fuel condition and the second sensing element 194 is associated with a low fuel condition. When the float 180 drops enough for the second sensor element 194 to detect the presence of the magnet 188, a signal is provided to a controller 198. The controller 198, in turn, takes remedial action by turning on the fuel lift pump 126 to inject more fuel into the vapor separator 128 and/or opening a vapor vent valve 136 to vent the fuel vapors out of the vapor separator 128. When the float 180 rises high enough for the first sensor element 192 to detect the presence of the magnet 188, a different signal is provided by the sensor assembly 190 to the controller 198, which takes remedial action by turning off the fuel lift pump 126 and/or by closing the vapor vent valve 136.

Those of skill in the art will appreciate alternative mounting arrangements for the float 180, such as a pivoting mount rather than the sliding arrangement shown. Other designs could also be implemented without departing from this concept of an externally mounted Hall Effect fuel level sensor 190 for a marine fuel vapor separator unit 128, which eliminates the need for pass-through connectors and enables a simplified design of the vapor separator unit 128 that is less susceptible to premature wear.

Figure 6A:
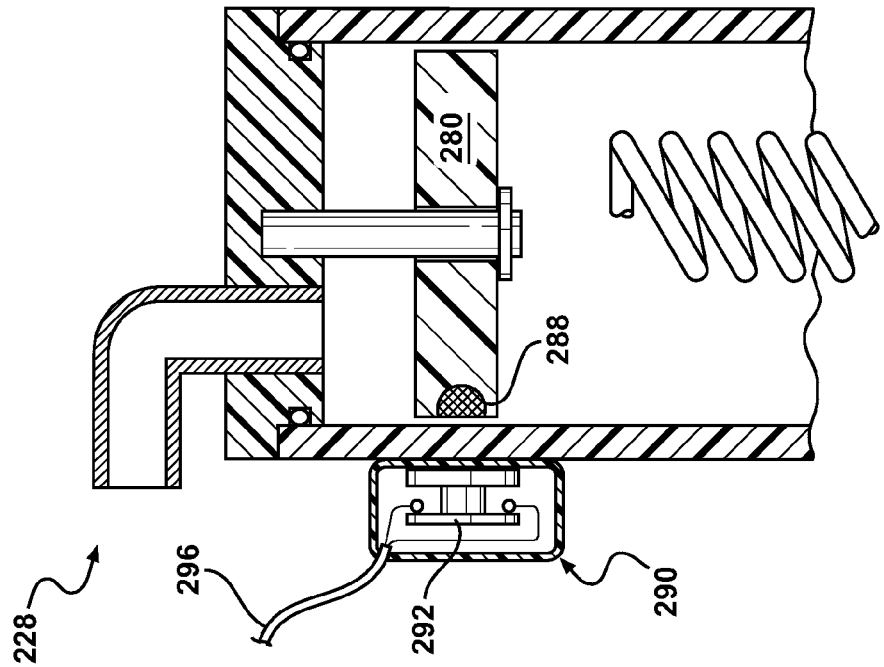
FIG. 6A is a cross-sectional and fragmentary view of a vapor separator constructed according to another aspect of the invention with a float being in an uppermost position.
Figure 6B:
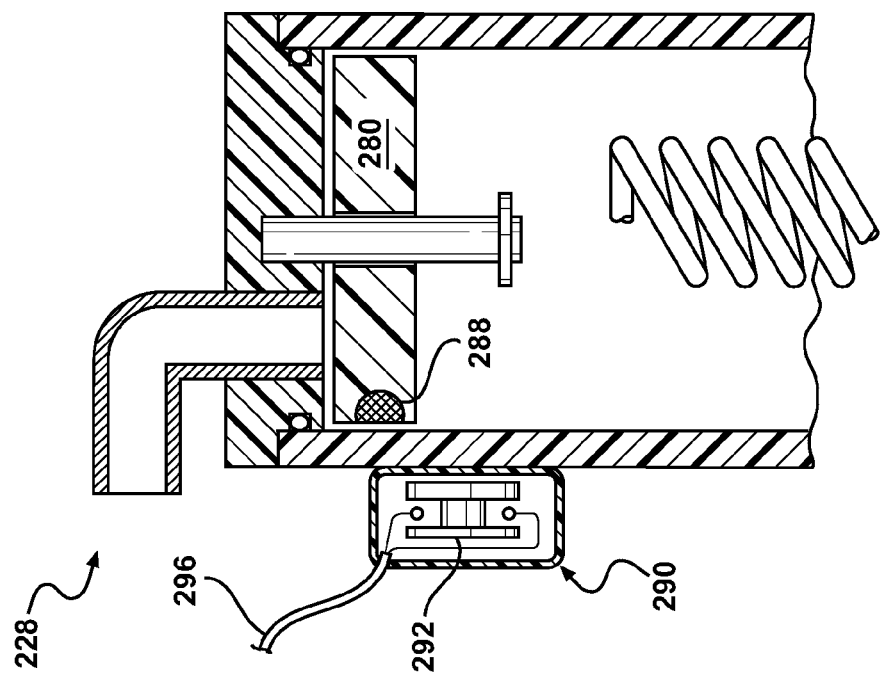
FIG. 6B is a cross-sectional and fragmentary view of the vapor separator of FIG. 6A and with the float being in a lowermost position.

FIGS. 6A and 6B are similar to the FIGS. 4A and 4B, but illustrate a vapor separator 228 constructed according to an alternate aspect of the invention wherein like or corresponding parts use the same reference numbers but offset by 100. In this embodiment, the sensor assembly 290 includes only a single, reed-type sensor element 292 as opposed to the two sensor elements 192, 194 discussed above. As will be appreciated by those having skill in the art of electronics, a reed-type switch is an electrical switch which is either opens or closes in the presence of a magnetic field and returns to a rest state (either open or closed) when separated from the magnetic field. In this embodiment, the magnet 288 carried in the float 280 acts on the reed switch element 292 when the float 280 and the magnet 288 are in the lower-most position shown in FIG. 6B. The sensor assembly 290, in turn, generates an electrical signal which is transmitted via the electrical cable 296 (or wirelessly) to a controller. Upon receiving the electrical signal, the controller takes remedial action, which might be turning the lift pump on and/or opening the vapor vent valve. It should be appreciated that the sensor assembly 290 could alternately be positioned to generate the electrical signal when the float 280 is in the upper-most condition. Even further, the reed-type switch assembly could be re-configured to operate in a dual-signal manner similar to the sensor assembly 190 shown in FIGS. 4A and 4B and discussed above.

Figure 7A:
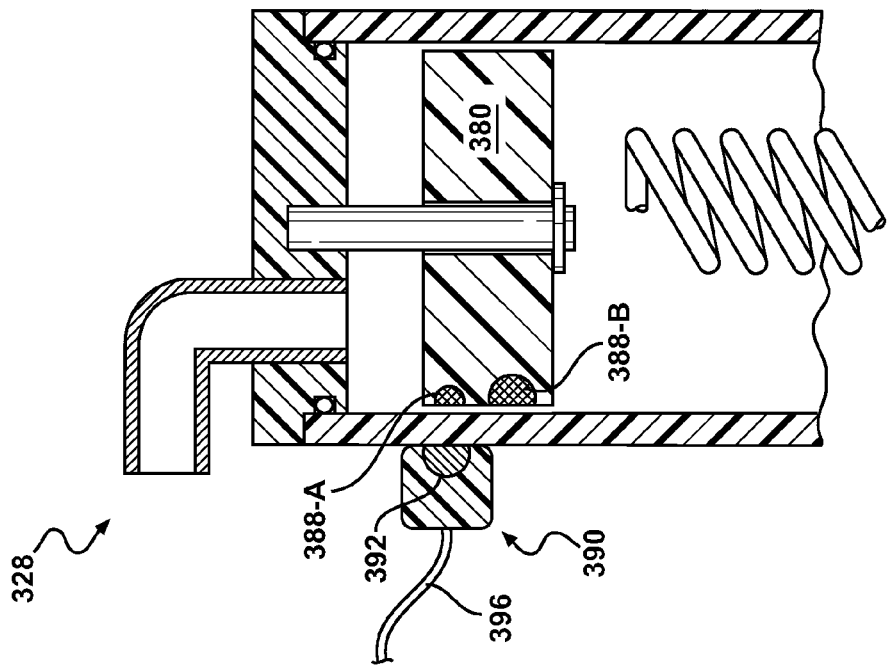
FIG. 7A is a cross-sectional and fragmentary view of a vapor separator constructed according to yet another aspect of the subject invention and with the float being in an uppermost position.
Figure 7B:
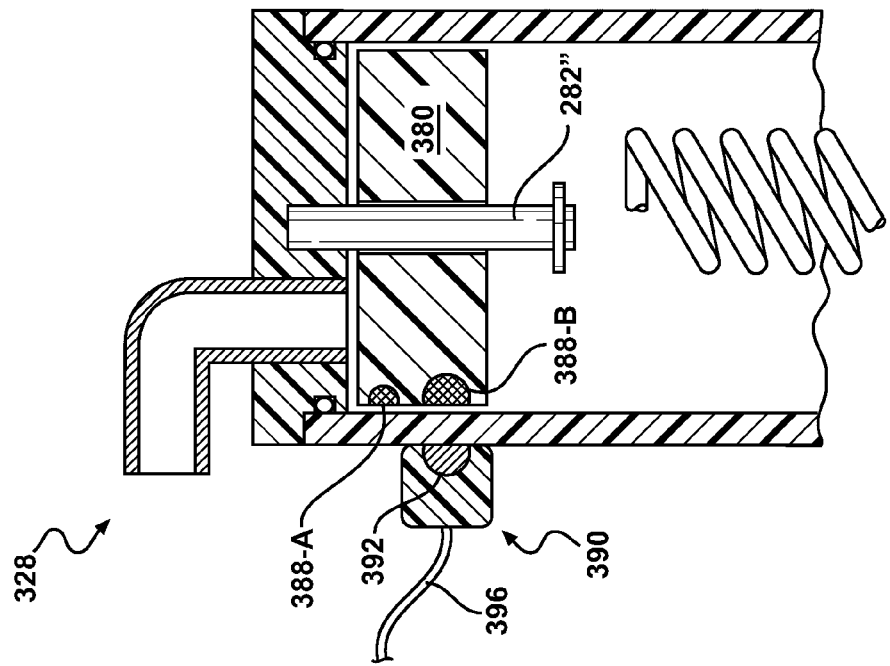
FIG. 7B is a cross-sectional and fragmentary view of the vapor separator of FIG. 7A and with the float being in a lowermost position.

FIGS. 7A and 7B are similar to the FIGS. 4A and 4B, but illustrate a vapor separator 328 constructed according to yet another aspect of the invention wherein like or corresponding parts use the same reference numbers but offset by 200. In this embodiment, the sensor assembly 390 includes only a single sensor element 392, and the float 380 carries two magnets 388-A and 388-B which are vertically spaced from one another and have either two different strengths or two different polarities. In this embodiment, magnet 388-A acts on the sensor element 392 when the float 380 is in lower-most condition shown in FIG. 7B. The sensor assembly 390, in turn, generates an electrical signal which is transmitted via the electrical cable 396 (or wirelessly) to a controller. Upon receiving the electrical signal, the controller takes remedial action, which might be turning the fuel lift pump on to pump more fuel into the fuel vapor separator 328 and/or opening the vapor vent valve to discharge vapor from the fuel vapor separator 328. Then, when the float 380 is raised to the position shown in FIG. 7A, magnet 388-B, which has a different strength or a different polarity than magnet 388-A, acts on the sensor element 392. The sensor assembly 390, in turn, generates a different electrical signal which is transmitted via the electrical cable 396 (or wirelessly) to the controller. Upon receiving this electrical signal, the controller takes remedial action, which might be turning the lift pump off and/or closing the vent valve. It should be appreciated that this embodiment of the vapor separator 328 could be reconfigured to accommodate a reed-type switch element, like that shown in FIGS. 6A and 6B.

Figure 8:
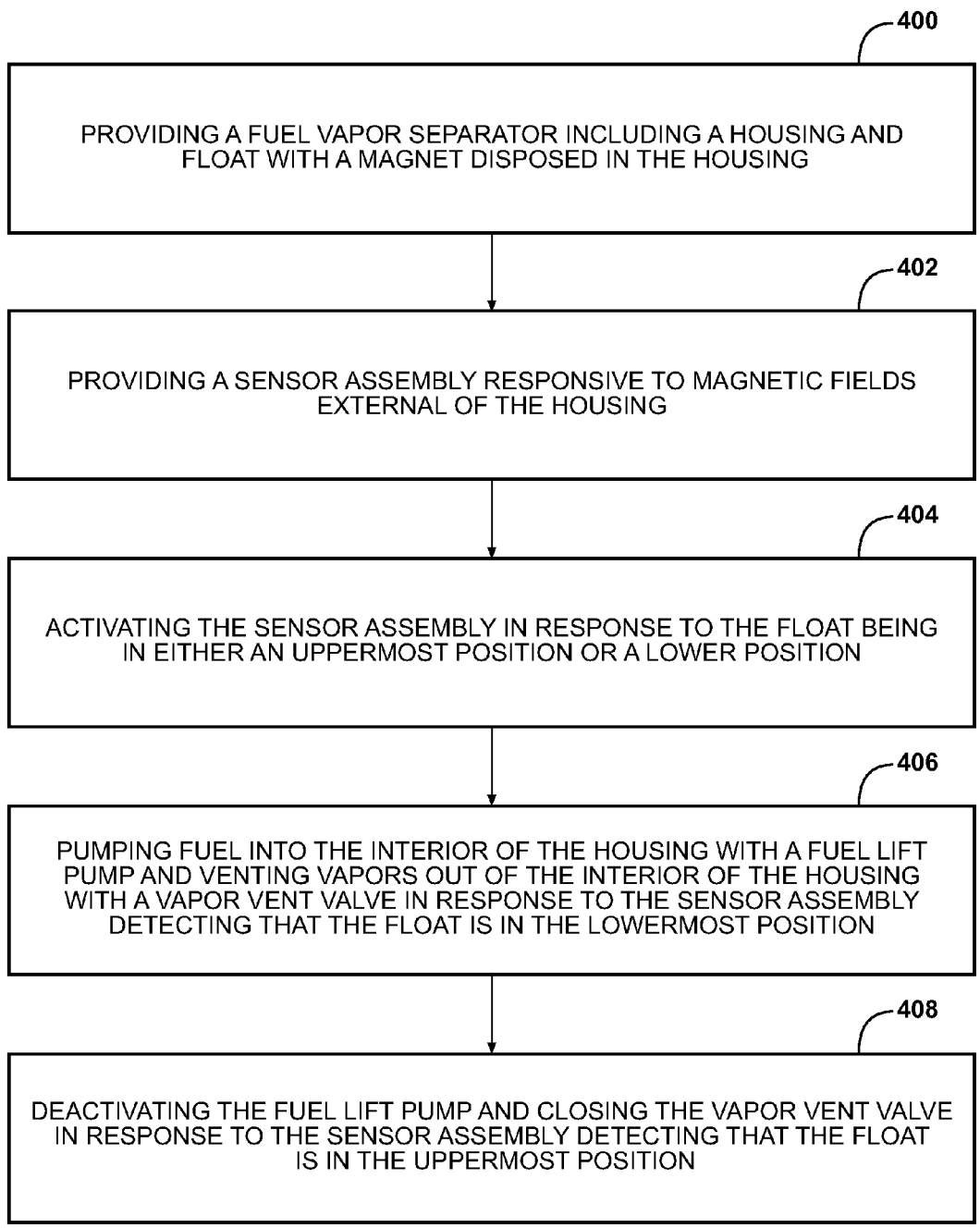
FIG. 8 is a flow chart of an exemplary method of operating a marine fuel delivery system.

Referring now to the flow chart of FIG. 8, the vapor separator 128 of FIG. 4 and the marine fuel delivery system of FIG. 5, another aspect of the present invention is a method of operating a marine fuel delivery system. The method starts with the step 400 of providing a fuel vapor separator 128 having an open interior with a float 180 disposed therein, wherein the float 180 is moveable in the open interior within pre-established constraints in response to changing fluid levels and wherein at least one magnet 188 is disposed on the float 180. The method continues with the step 402 of providing a sensor assembly 190 responsive to the magnet 188 and disposed externally of the fuel vapor separator 128. As discussed above, the sensor assembly 190 could be, for example, a Hall Effect type sensor, a reed-type sensor or any other type of sensor responsive to magnetic fields.

The method then continues with the step 404 of activating the sensor assembly 190 in response to the float 180 being in either the upper or the lower of the vertically spaced pre-established constraints. The method may also include the step 406 of pumping fuel into the open interior of the fuel vapor separator 128 with a fuel lift pump 126 and/or venting fuel vapors out of the open interior with a vapor vent valve 136 in response to the sensor assembly 190 detecting that the float 180 is in the lower of the pre-established constraints. The method may additionally include the step 408 of deactivating the fuel lift pump 126 and/or closing the vapor vent valve 136 in response to the sensor assembly 190 detecting that the float 180 is in the upper of the pre-established constraints.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. A fuel vapor separator apparatus comprising:
    a low pressure pump configured to pump fuel from a fuel tank;
    a vapor separator chamber configured to (i) receive the fuel pumped from the fuel tank, (ii) contain the received fuel, (iii) enable vapor to separate from the fuel while the fuel is contained in the vapor separator chamber, and (iv) provide the fuel to an engine;
    a vent pipe extending from a top end of the chamber to channel a flow of the vapor out of the chamber;
    a float that is located in the chamber, and configured to move vertically with vertical movement of a level of the fuel in the chamber, and vertically constrained between an uppermost position and a lowermost position;
    a magnet assembly that is located inside the chamber and includes:
        an upper magnet that is on the float and is configured to enable detecting that the float is at a lower level; and
        a lower magnet that is on the float and lower than the upper magnet and of different magnetic strength or different magnetic polarity than the upper magnet, and is configured to enable detecting that the float is at an upper level;
    a sensor that is located outside the chamber and configured to be acted on by the lower magnet when the float is in the uppermost position and to be acted on by the upper magnet when the float is in the lowermost position, to detect, based on the difference in the magnetic strength or the difference in magnetic polarity, whether the float is at the higher level or at the lower level; and
    a valve that is located along the vent pipe and configured to selectively enable and disable flow of the vapor out of the chamber;
    a controller configured to:
        in response to detecting that the float is at the lower level, (i) turn on the low pressure pump and (ii) control the valve to enable flow of the vapor out of the chamber, and
        in response to detecting that the float is at the upper level, (i) turn off the low pressure pump and (ii) control the valve to disable flow of the vapor out of the chamber.

2. The apparatus of claim 1, wherein the apparatus is configured for the vapor, that flows out of the chamber through the vent pipe, to be discharged to the atmosphere.

3. The apparatus of claim 1, further comprising a high pressure pump configured to pump the fuel from the chamber to the engine.

4. A fuel vapor separator apparatus comprising:
    a low pressure pump configured to pump fuel from a fuel tank;
    a vapor separator chamber configured to (i) receive the pumped fuel from the low pressure pump, (ii) contain the received fuel, (iii) enable vapor to separate from the fuel while the fuel is contained in the vapor separator chamber, and (iv) provide the fuel to an engine;
    a float that is located in the chamber, and configured to move vertically with vertical movement of a level of the fuel in the chamber, and vertically constrained between an uppermost position and a lowermost position;
    a magnet assembly that is located inside the chamber and includes:
        an upper magnet that is on the float and is configured to enable detecting that the float is at a lower level; and
        a lower magnet that is on the float and lower than the upper magnet and of different magnetic strength or different magnetic polarity than the upper magnet, and is configured to enable detecting that the float is at an upper level;
    a sensor that is located outside the chamber and configured to be acted on by the lower magnet when the float is in the uppermost position and to be acted on by the upper magnet when the float is in the lowermost position, to detect, based on the difference in the magnetic strength or the difference in magnetic polarity, whether the float is at the higher level or at the lower level; and
    a controller configured to (i) turn on the low pressure pump in response to detecting that the float is at the lower level and (ii) turn off the low pressure pump in response to detecting that the float is at the upper level.

5. The apparatus of claim 1, further comprising a valve configured to be controlled by the controller to (i) enable flow of the vapor out of the chamber in response to detecting that the float is at the lower level and (ii) disable flow of the vapor out of the chamber in response to detecting that the float is at the upper level.

6. The apparatus of claim 5, further comprising a vent pipe extending from the chamber to channel a flow of the vapor out of the chamber, wherein the valve is located along the vent pipe.

7. The apparatus of claim 6, wherein the vent pipe extends from the top end of the chamber to the engine.

8. The apparatus of claim 6, wherein the apparatus is configured for the vapor that flows out of the chamber through the vent pipe to be discharged to the atmosphere.

9. The apparatus of claim 1, further comprising a high pressure pump configured to pump the fuel from the chamber to the engine.

10. The apparatus of claim 1, wherein the apparatus is configured for the vapor, that flows out of the chamber through the vent pipe, to be discharged to the engine.

* * * * *